United States Patent
Borsuk et al.

(10) Patent No.: US 9,502,149 B2
(45) Date of Patent: Nov. 22, 2016

(54) ULTRAVIOLET SYSTEMS AND METHODS FOR IRRADIATING A SUBSTRATE

(71) Applicant: Nordson Corporation, Westlake, OH (US)

(72) Inventors: James M. Borsuk, Westlake, OH (US); Gregory W. Harrell, Clyde, OH (US); James M. Khoury, Strongsville, OH (US); Edward C. McGhee, Powell, OH (US); James C. Smith, Amherst, OH (US); Hallie Smith-Petee, Huron, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 14/456,062

(22) Filed: Aug. 11, 2014

(65) Prior Publication Data
US 2016/0042828 A1    Feb. 11, 2016

(51) Int. Cl.
| G21K 5/00 | (2006.01) |
| G21K 5/04 | (2006.01) |
| G21K 1/00 | (2006.01) |
| H01J 65/04 | (2006.01) |
| H05B 41/24 | (2006.01) |

(52) U.S. Cl.
CPC . *G21K 5/04* (2013.01); *G21K 1/00* (2013.01); *H01J 65/044* (2013.01); *H05B 41/24* (2013.01)

(58) Field of Classification Search
CPC .......................................................... G21K 5/00
USPC ..................................................... 250/492.1
See application file for complete search history.

(56) References Cited

U.S. PATENT DOCUMENTS

| 3,978,361 | A | 8/1976 | Hiramoto |
| 4,504,768 | A * | 3/1985 | Ury ................ H01J 65/044 313/611 |
| 5,039,918 | A | 8/1991 | Ohtake et al. |
| 5,825,132 | A | 10/1998 | Gabor et al. |
| 5,854,542 | A * | 12/1998 | Forbes ................ G07F 9/02 315/101 |
| 6,610,990 | B1 | 8/2003 | Moruzzi |
| 7,952,289 | B2 | 5/2011 | Bretmersky et al. |
| 8,373,352 | B2 * | 2/2013 | Doughty .......... H01J 65/044 315/185 S |
| 8,446,107 | B2 * | 5/2013 | Gluzman .......... H05B 37/0272 315/291 |
| 2002/0047615 | A1 | 4/2002 | Yokozeki et al. |
| 2005/0047139 | A1 | 3/2005 | Seo |
| 2013/0169151 | A1 | 7/2013 | Borsuk et al. |

FOREIGN PATENT DOCUMENTS

EP    0962959 A2    12/1999

OTHER PUBLICATIONS

International Application No. PCT/US2015/041962: International Search Report and Written Opinion dated Jan. 27, 2016, 39 pages.

* cited by examiner

*Primary Examiner* — Phillip A Johnston
(74) *Attorney, Agent, or Firm* — Baker & Hostetler LLP

(57) ABSTRACT

A UV system for irradiating a substrate includes a lamphead having an enclosure with an interior. A UV bulb is positioned in the interior and is capable of emitting UV energy when excited by RF energy. The UV system also includes a solid state RF source capable of generating the RF energy. The RF energy is transmitted to the UV bulb, which causes the UV bulb to ignite and emit the UV energy from the interior of the lamphead.

16 Claims, 6 Drawing Sheets

ULTRAVIOLET SYSTEMS AND METHODS FOR IRRADIATING A SUBSTRATE

TECHNICAL FIELD

The present invention generally relates to ultraviolet ("UV") systems for irradiating a substrate and, more particularly, to the configuration and interaction of radio frequency ("RF") energy sources and a UV bulb used in such systems.

BACKGROUND

Conventional UV systems include one or more magnetrons and a UV bulb. Upon the application of power, the magnetrons generate RF energy that is transmitted to the UV bulb through a waveguide, thereby igniting a gas within the UV bulb and causing the gas to enter into a plasma state. As a result of this excitement, the UV bulb begins to emit UV energy, which is then used for various applications. For example, the UV energy can irradiate a substrate for purposes of curing materials thereon or for other reasons, such as surface treatment. Materials, such as inks or adhesives for example, may be cured on the substrate by directing the emitted UV energy onto the materials. As another example, the UV energy can be directed at the substrate to modify the surface thereof.

In such conventional UV systems, high powered magnetrons are required to achieve adequate RF energy for causing the gas in the UV bulb to enter into the plasma state. The one or more magnetrons are typically enclosed in a lamphead with the UV bulb. If more than one magnetron is used, the frequencies of the RF energy generated by the magnetrons must be far enough apart to prevent one magnetron from damaging or interfering with another, but at the same time must be sufficient for adequately exciting the UV bulb. Consequently, implementation of multiple magnetrons within one lamphead, especially implementing more than two magnetrons, causes operational problems and reduced effectiveness. This is because when multiple magnetrons are used, a broader range of RF frequencies is required. Some frequencies in the range have reduced effectiveness in exciting the UV bulb.

Within the conventional lamphead, the UV bulb is mounted within a metallic microwave cavity or chamber and located at the focal point of a parabolic reflector. During operation, RF energy produced by the magnetrons travels through the waveguide to the microwave cavity or chamber, thereby causing the UV bulb mounted therein to ignite and emit UV energy as described above. For this prior art lamphead configuration to be viable, precise cooling of the lamphead is required to sufficiently remove heat produced by the magnetron and provide a proper distribution of cooling air over the length of the UV bulb. Cooling must be precise because undercooling the magnetron or UV bulb can cause permanent damage to these components, and overcooling the UV bulb can adversely affect the UV output or even extinguish the bulb, thereby causing the gas of the bulb to separate and consequently preventing the bulb from being re-started. Because of the volume of air that is needed to adequately cool both the magnetrons and the UV bulb, conventional UV lampheads typically incorporate air blowers and specifically designed plenums. Due to factors such as cooling and bulb starting, tapered UV bulbs are used having a narrower diameter in the center region than at the end regions. This particular bulb shape helps compensate for the balancing act between cooling the magnetrons without overcooling the UV bulb. However, such a shape increases both the complexity and cost of manufacturing the UV bulb.

The configuration of the lamphead used in conventional UV systems has additional challenges. For example, the use of magnetrons and their containment in the lamphead with the UV bulb causes the overall system to have a power efficiency of about 70-80%, partly due to the unstable RF output that is characteristic of magnetrons and to the cooling requirements discussed above. In addition, such a lamphead configuration causes an increase in the required size and weight of the lamphead. Furthermore, because magnetrons are slow to start and stop, conventional UV systems often incorporate a starter bulb within the lamphead. The starter bulb is powered at the same time the magnetrons are initially energized and helps the UV bulb to ignite faster, thereby allowing the prior art UV system to begin producing UV energy faster. The starter bulb further increases the size of the lamphead and power consumption.

In addition, to produce maximum UV energy from a UV bulb it is necessary to uniformly distribute the RF energy along the length of the bulb. Furthermore, the intensity of emitted UV energy largely depends on the RF energy applied to the UV bulb. Although the waveguides used in conventional UV systems help distribute the RF energy produced by the magnetrons across the length of the bulb, such waveguides have a fixed geometry and require a standing wavelength directly proportional to a magnetron's output frequency. Because the magnetrons do not provide a highly stable or finely tunable RF output frequency, inefficient RF energy coupling and uneven irradiation of the UV bulb may occur.

Magnetrons also have a limited life span because of filament degradation over time. When used as part of the conventional UV system, the life of a magnetron may be as low as 1,000 hours. The limited life of magnetrons is a concern, as the down time from replacing dead magnetrons can be expensive. As a result, aggressive maintenance schedules are often implemented to replace magnetrons before they fail, and this further adds to costs.

For these reasons, as well as others, it would be desirable to provide UV systems and methods that improve upon areas such as power efficiencies, output, versatility, and component lifespan.

SUMMARY

Generally, the present invention provides a UV system for irradiating a substrate. The UV system comprises a lamphead including an interior, and a solid state RF source capable of generating RF energy. A UV bulb is positioned in the interior of the lamphead and is capable of emitting UV energy when excited by the RF energy generated by the solid state RF source. In one illustrative embodiment, the solid state RF source is located outside the interior of the lamphead. Alternatively, the solid state RF source is located inside the interior of the lamphead.

Various additional features are included in the embodiments of this invention. For example, a cooling device is located inside or outside the interior of the lamphead for directing cooling air at the UV bulb. An RF transmitter is coupled to the solid state RF source and is capable of receiving the RF energy from the solid state RF source and directing the RF energy toward the UV bulb. In some embodiments, the RF transmitter further comprises at least one antenna positioned proximate to the UV bulb. In an illustrative embodiment, a plurality of antennas is used and the antennas are spaced along the length of the UV bulb.

When the solid state RF source is located inside the interior of the lamphead, the RF transmitter can comprise a waveguide.

In accordance with another embodiment, the system includes a controller for sending at least one control signal to the solid state RF source. The control signal defines a frequency for the RF energy generated by the solid state RF source. In still further embodiments, at least one additional solid state RF source is provided and capable of generating RF energy directed at the UV bulb. In accordance with these embodiments, the controller sends at least one control signal respectively to each of the solid state RF sources. Each control signal defines a frequency for the RF energy generated by the respective solid state RF source.

The invention also generally provides a method of irradiating a substrate with UV energy. The method includes generating RF energy with a solid state RF source and transmitting the generated RF energy to a UV bulb in a lamphead. The UV bulb is ignited with the generated RF energy and UV energy is generated from the ignited UV bulb. The substrate is irradiated with the UV energy by directing the UV energy out of the lamphead and at the substrate. In various embodiments, the method further includes generating a first data signal and receiving the first data signal at the solid state RF source defining a first desired frequency for the generated RF energy. Generating the RF energy with the solid state RF source comprises generating RF energy having the first desired frequency with the solid state RF source and igniting the UV bulb with the generated additional RF energy. The method further includes generating a second data signal and receiving the second data signal at a second solid state RF source defining a second desired frequency equal to the first desired frequency. Additional RF energy is generated with the second solid state RF source and having the second desired frequency. The additional RF energy is transmitted to the UV bulb and the UV bulb is ignited with the generated additional RF energy.

Various additional features and advantages of the invention will become more apparent to those of ordinary skill in the art upon review of the following detailed description of the illustrative embodiments taken in conjunction with the accompanying drawings.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Figure 1:
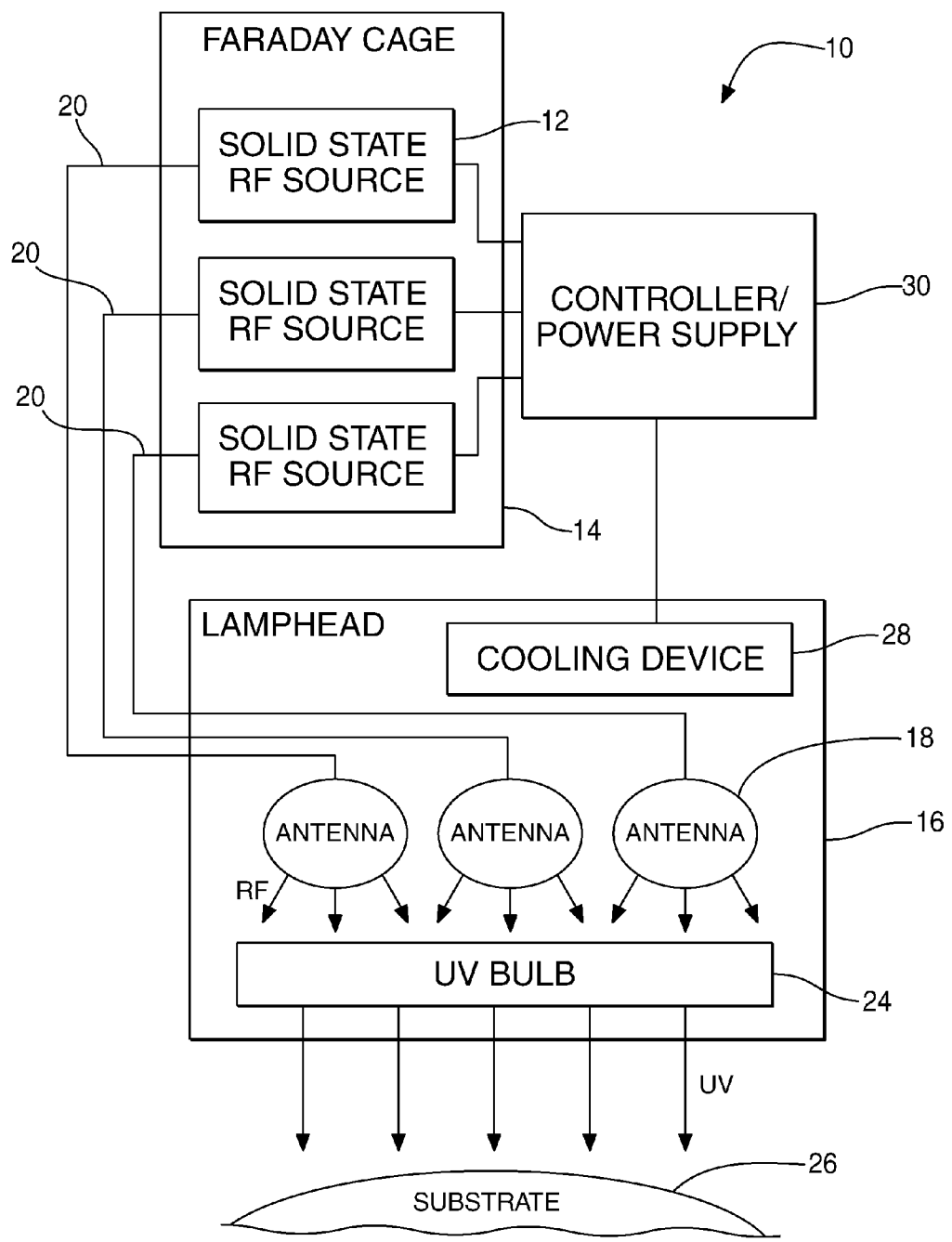
FIG. 1 is a schematic diagram of a UV irradiation system including a solid state RF source located outside a lamphead and a cooling device located inside the lamphead.

FIG. 1 provides a schematic diagram of an exemplary UV system 10 for irradiating a substrate. The UV system 10 includes one or more solid state RF sources 12 capable of generating RF energy. As an example, a suitable solid state RF source 12 may be Panasonic Part Number SSMM-200-A01. In some embodiments, a solid state RF source 12 comprises a plurality of solid state RF generating devices connected together using a combiner. In some embodiments, the solid state RF sources 12 are placed in a faraday cage 14.

UV system 10 also includes a lamphead 16 with an interior. The solid state RF sources 12, which are located outside of the interior of the lamphead 16, are coupled by one or more cables 20 to one or more antennas 18 located within the interior of the lamphead 16. Preferably, a plurality of antennas are located within the interior of the lamphead 16. Cables 20 may include any type of propagation medium suitable for carrying the RF energy generated by the solid state RF sources 12 to the antennas 18, such as at least one coaxial cable. In some embodiments, each of the cables are connected near or at the solid state RF sources 12 to a multi-line cable that holds multiple cables 20, such as a multi-coaxial cable. Upon entering or in the interior of the lamphead, the cables 20 may then be split from the multi-line cable to each of the antennas 18 inside the interior of the lamphead 16, thereby reducing the clutter caused by having multiple separated cables 20 running to the lamphead 16. In one embodiment, each solid state RF source 12 is coupled to a single antenna 18. Alternatively, a solid state RF source 12 may be coupled to more than one antenna 18 using a splitter.

UV system 10 also includes a UV bulb 24 positioned in the interior of the lamphead 16 and capable of emitting UV energy. In general, the UV bulb 24 is elongate and contains a gas mixture that, when excited by the RF energy produced by the solid state RF sources 12, enters into a plasma state. This excitement of the gas causes the UV bulb 24 to ignite and emit UV energy from the interior of the lamphead 16, which can then be directed toward a substrate 26 to, for example, modify the surface thereof or cure a material thereon. The substrate 26 can be any surface suitable for receiving UV energy during an irradiation process. Non-limiting examples include plastics, metals, silicones, leather, fibers, composites, glass, and the like. The UV bulb 24 may be of any type suitable for producing UV energy when introduced to RF energy, such as a Mercury filled quartz bulb with or without Iron, Gallium, Indium, Lead, and/or other gas additives.

The one or more antennas 18 are positioned proximate to the UV bulb 24, meaning the antennas 18 are in such a position so that RF signals sent from the antennas 18 are able to reach and effectively excite the UV bulb 24. To that end, an antenna 18 can be any device capable of receiving the RF energy from a solid state RF source 12 and directing the RF energy toward the UV bulb 24. In one embodiment, RF energy produced by the solid state RF sources 12 is transmitted through the cables 20 to the antennas 18, which distribute the RF energy across the length of the UV bulb 24.

In general, the arrangement of antennas 18 is capable of providing even heating along the UV bulb 24. In one embodiment, each antenna 18 is a circular antenna optimized to a frequency or a range of frequencies of radiation. Additionally and/or alternatively, each antenna 18 may be placed along the length of a UV bulb 24 so that there is minimal or no overlap between the RF energy transmitted from each of the antennas 18. Furthermore, the RF energy signal emitted from each antenna 18 may have a highest energy density in the middle of the signal.

In some embodiments, each of the antennas 18 is positioned at a same distance from a surface of the UV bulb 24, such as at about ½ inch from the surface of the UV bulb 24, for example. Additionally and/or alternatively, each of the antennas 18 may be placed at equal intervals along the surface of the UV bulb 24. In one exemplary embodiment, when a 6" UV bulb and three 1000 watt solid state RF sources 12 are implemented in the UV system 10, an antenna 18 may be placed every 1.5" to 2" along the surface of the UV bulb 24 (e.g., three antennas placed along the surface of the UV bulb 24). In another example, when a 3" UV bulb is implemented in the UV system 10, two antennas 18 may be placed along the surface of the UV bulb 24. In other embodiments, one antenna may be used for even smaller UV bulbs 24.

Unlike the magnetrons used in conventional UV systems, the solid state RF sources 12 are designed so as to inhibit the RF energy generated by one solid state RF source 12 from affecting another, regardless of the frequency of the RF signal. Accordingly, the operational concerns related to RF frequency when using multiple magnetrons are not present in UV system 10. Hence, each of the solid state RF sources 12 may generate RF energy of the same or near same frequency during an irradiation process, which further causes a more even and effective heating of the UV bulb 24.

Furthermore, because of the longer operational life of solid state RF sources 12 as compared to magnetrons, UV system 10 can operate for a longer time span without needing repair or replacement parts. Consequently, the costs associated with repetitive maintenance and replacement parts are reduced.

The UV system 10 also includes a cooling device 28. In general, the cooling device 28 is capable of keeping the contents of the lamphead 16, such as the UV bulb 24, from overheating during operation of the UV system 10. In some embodiments, the cooling device 28 is positioned in the interior of the lamphead 16. Additionally and/or alternatively, the cooling device 28 may be positioned external to the lamphead 16 (e.g., FIG. 2).

Unlike the prior art UV system, the volume of air needed to properly cool the lamphead 16 of UV system 10 is lessened because the heat-generating RF source is not present within the lamphead 16. Hence, alternative to air blowers, cooling device 28 may include one or more air knifes and/or a plurality of nozzles capable of cooling the contents of the lamphead 16. The air knives and nozzles each offer more precise and effective cooling than air blowers when the volume of required cooling is smaller. During an irradiation process, air knives are capable of producing a sheet of airflow to cool the contents of the lamphead 16, such as the UV bulb 24. The plurality of nozzles are capable of producing a plurality of air jet streams to cool the contents of the lamphead 16 during an irradiation process. The sheet of airflow and/or air jet streams may be uniform, laminar, non-uniform, and/or turbulent. Furthermore, the air jet streams and/or sheet of airflow may be formed from compressed air and/or cooled air. In one exemplary embodiment, the compressed air and/or cooled air include an inert gas.

Because the solid state RF sources 12 are located outside of the interior of the lamphead 16 in UV system 10, the balancing act between sufficiently cooling the magnetrons and cooling, without overcooling, the UV bulb 24 ceases to exist. Therefore in some embodiments, because more attention and precision, via the air knifes and/or nozzles for example, can be directed to cooling the UV bulb 24, the UV bulb 24 may be manufactured with a central region having the same diameter as the opposite end regions. Such a bulb configuration reduces the complexity and cost of manufacturing the UV bulbs 24 as compared to the prior art bulbs, for the narrowed diameter center region relative to the opposite end regions is no longer present.

Also because the solid state RF sources 12 are located outside the interior of the lamphead 16 in UV system 10, the lamphead 16 can be made smaller and lighter. Consequently, the lamphead 16 may be easier to mount and focus onto a substrate 26.

Both the solid state RF sources 12 and cooling device 28 of UV system 10 are coupled to a controller and power supply 30. The controller and power supply 30 is capable of transmitting a power signal and at least one control signal to each of the solid state RF sources 12 and cooling device 28, thereby controlling the operation of each. For example, the controller and power supply 30 may send a control signal to the solid state RF sources 12 defining a frequency of RF energy to be generated. The controller and power supply 30 may also include an interface for receiving interaction and instruction from a user. For example, based on a received user interaction, the controller and power supply 30 may generate and transmit an appropriate control signal to each of the solid state RF sources 12 and cooling device 28. The controller and power supply 30 may include any suitable computing device capable of generating the control signals, such as a PC, processor, or microprocessor based controller. In some embodiments, the controller and power supply 30 is implemented as part of other devices disclosed herein, such as the solid state RF sources 12 or the cooling device 28. In some embodiments, the controller and power supply 30 comprises a controller and power supply incorporated into separate housings or devices. Each separate housing or device may likewise be implemented as part of another device disclosed herein.

Figure 2:
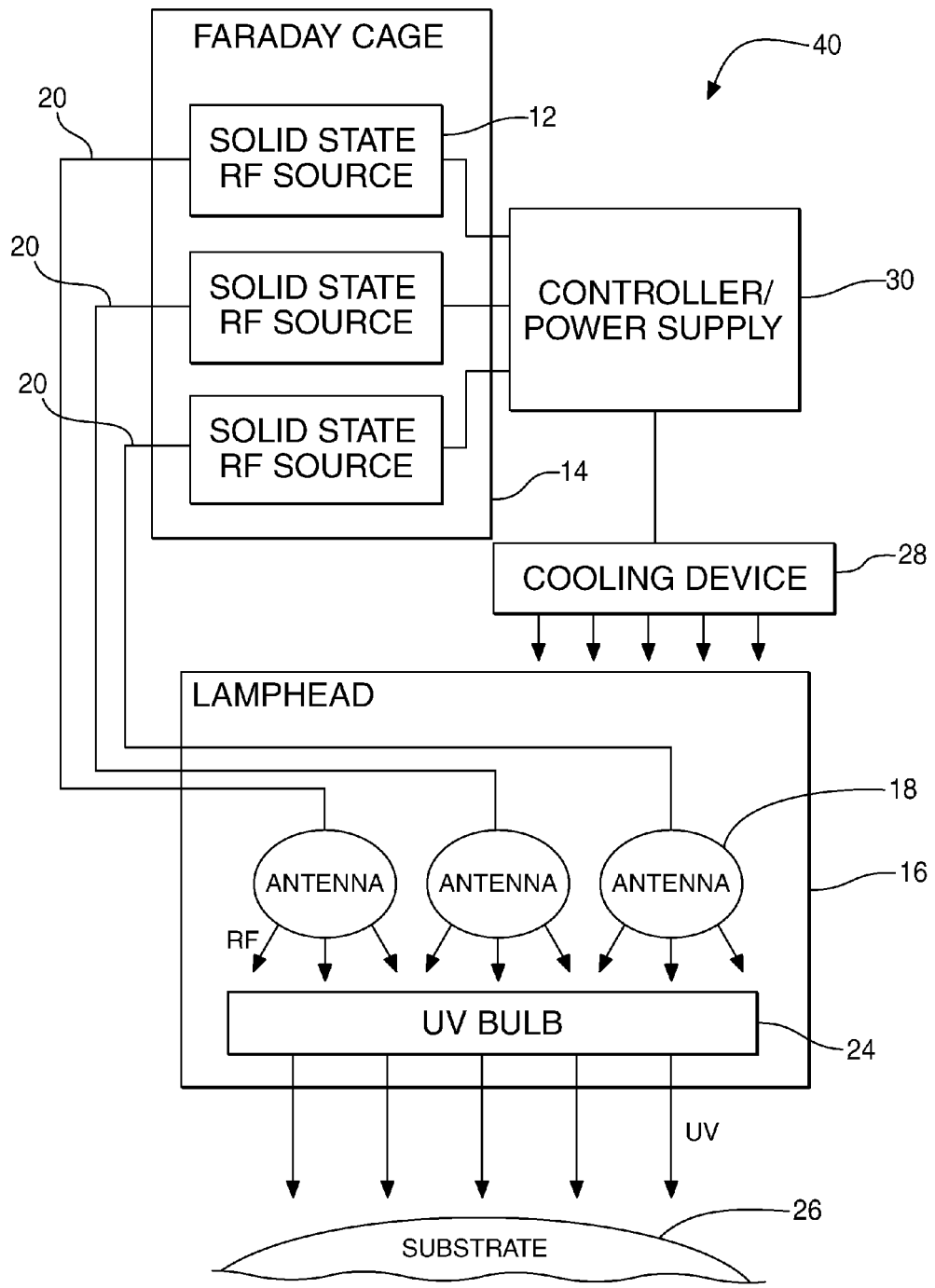
FIG. 2 is a schematic diagram of a UV irradiation system including a solid state RF source and a cooling device located outside a lamphead.

FIG. 2 illustrates an exemplary UV system 40 that includes all of the features of UV system 10, except that the cooling device 28 is located external to the lamphead 16.

Alternative to the illustrated antennas 18 and cables 20, systems 10 and 40 may include waveguides coupled to the solid state RF sources 12 and that extend into the interior of the lamphead 16. Under this configuration, the RF energy generated by the solid state RF sources 12 is carried by the waveguides toward the UV bulb 24, thereby causing the excitement and ignition thereof. Although waveguides may reduce the amount of RF energy loss during transmission as compared to the antennas 18 and cables 20, such an effect depends on the transmitted RF energy having a frequency directly proportional to the geometry of the waveguide. Unlike the magnetrons used in conventional UV systems, however, solid state RF sources 12 can be finely tuned to a specific operating frequency. Hence, because antennas 18 and cables 20 are capable of being broadband and therefore transmitting a wider range of RF frequencies than waveguides, cables 20 and antennas 18 offer certain advantages over waveguides if the generated RF frequencies are varied. For example, a waveguide may not be able to effectively transmit an RF signal that has been tuned to a frequency varying from the frequency for which the waveguide was intended.

Furthermore, the configuration of the antennas 18 and cables 20 of UV systems 10 and 40 allows for the more even heating and excitement of a UV bulb 24, as multiple antennas 18 may be positioned around and/or precisely directed to emit RF energy toward different regions of the UV bulb 24. Not only does such a configuration increase the overall efficiency of the UV system, but because antennas 18 and cables 20 can be configured to use less real estate of the interior of the lamphead 16 than waveguides, the size of the lamphead 16 may also be reduced.

Furthermore, unlike the unstable and frequency-separated RF signals produced by the magnetrons in conventional systems, the solid state RF sources 12 can be finely tuned to produce a stable RF energy signal, each being at the same or near same frequency. As previously mentioned, the intensity of UV energy produced by a UV bulb 24 largely depends on the RF energy being applied. Indeed, RF energy signals of an unstable frequency can result in uneven and inefficient heating of the UV bulb 24, thereby adversely affecting the intensity of the UV energy emitted therefrom. But, unlike the magnetrons, which are known to produce unstable RF energy in substrate irradiation applications, the solid state RF sources 12 can be finely tuned to a specific frequency, thereby increasing the amount of UV energy produced by the UV bulb 24.

In addition, solid state RF sources 12 begin producing RF energy faster upon startup than the magnetrons used in conventional systems. As a result, the starter bulb included in conventional lampheads can be omitted, thereby further reducing the size of the lamphead 16 and the power consumed by the UV system. In some embodiments, a frequency sweep of the solid state RF sources 12 is performed during initiation of a UV irradiation process and/or ignition of the UV bulb 24 to further improve starting time. Therefore, the irradiating process can be started and stopped quicker, thereby improving system throughput.

Figure 3:
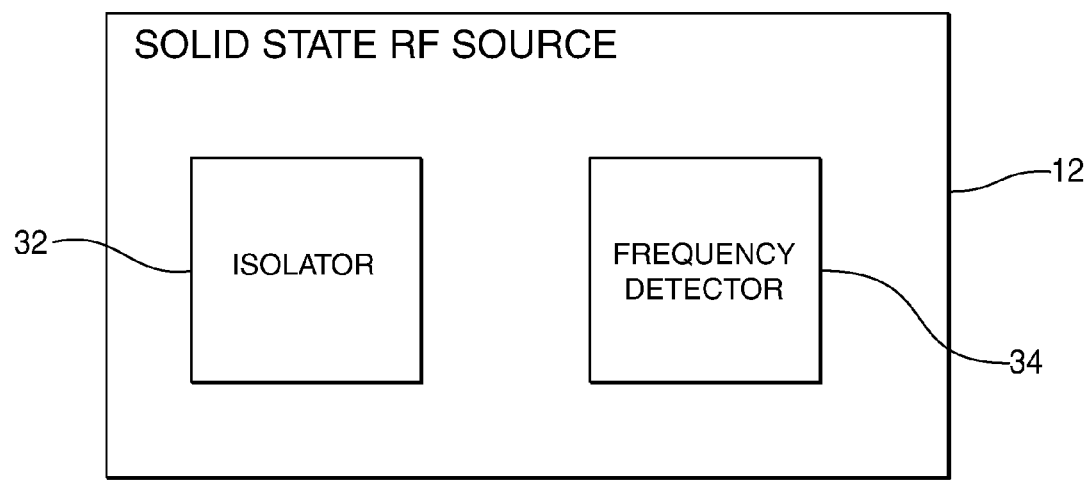
FIG. 3 is a schematic diagram of a solid state RF source.

FIG. 3 illustrates exemplary components of each solid state RF source 12, namely, an isolator 32 and a frequency detector 34.

The isolator 32 is capable of allowing RF energy to exit the solid state RF source 12 while simultaneously preventing RF energy from entering the solid state RF source 12. Hence, unlike multiple magnetrons, multiple solid state RF sources 12 can each produce RF energy with the same or near same frequency and with little risk of adversely affecting one another, which results in a more uniform and controllable heating of the UV bulb 24.

The frequency detector 34 of the solid state RF source 12 is capable of detecting the frequency of the output RF energy and adjusting the solid state RF source 12 as needed to maintain a desired RF frequency output during an irradiation process.

Figure 4:
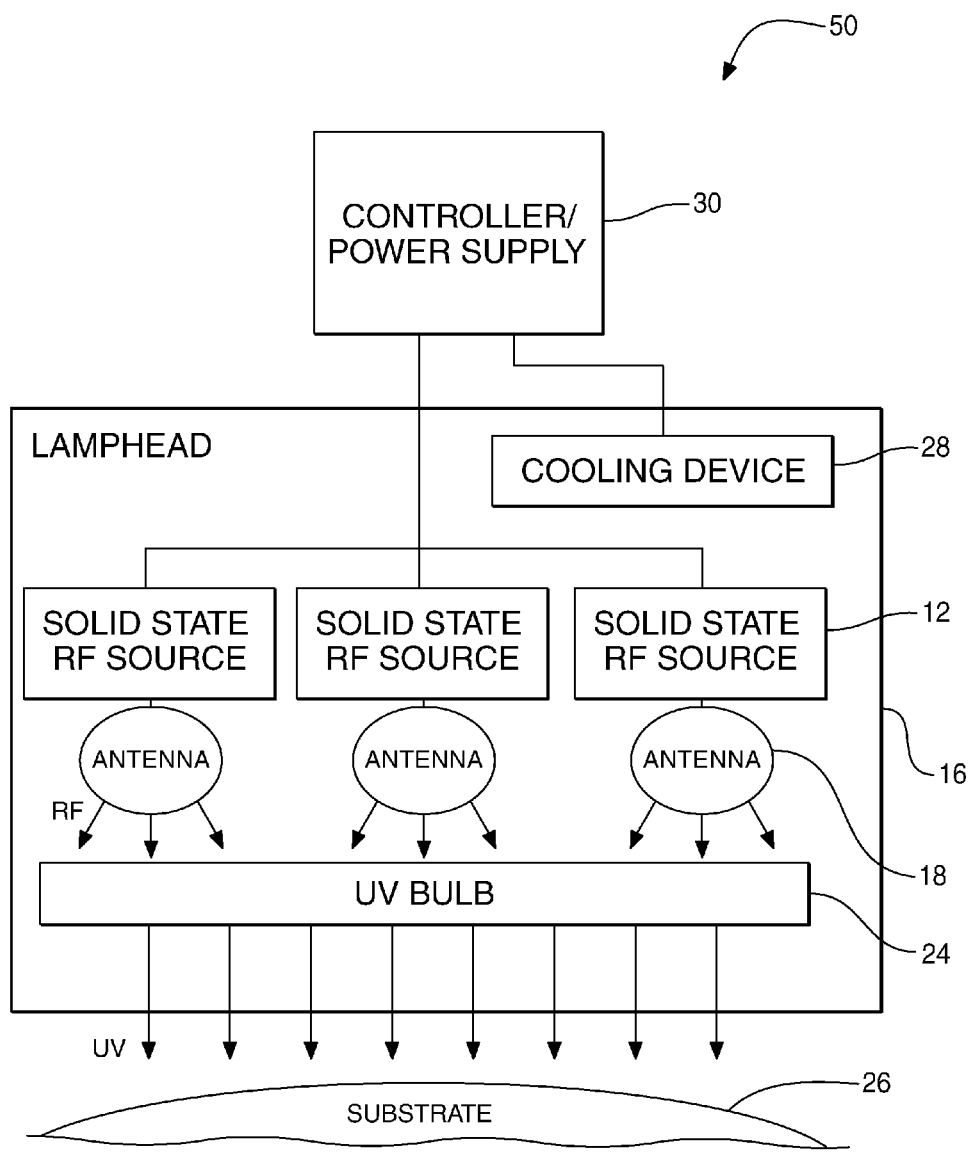
FIG. 4 is a schematic diagram of a UV irradiation system including a solid state RF source and a cooling device located inside a lamphead.

FIG. 4 provides a schematic diagram of an exemplary UV system 50 having the solid state RF sources 12 located inside of the lamphead 16 with the UV bulb 24 and the cooling device 28. In one embodiment of UV system 50, the antennas 18 are coupled to the solid state RF sources by a small cable 20 (e.g., FIG. 1). Alternatively, the antennas 18 may be directly connected to the solid state RF sources 12. In yet another embodiment, the antennas 18 are coupled to the solid state RF sources 12 by other suitable interim components, such as an impedance matching device and an impedance controlled cable. As with UV systems 10 and 40, each solid state RF source 12 of UV system 50 may be coupled to a signal antenna 18, and alternatively each solid state RF source 12 may be coupled to more than one antenna 18 via a splitter.

Placing the solid state RF sources 12 inside the lamphead 16 offers certain advantages. For example, the closer or shorter connection between the solid state RF sources 12 and the antennas 18, the less RF energy loss that will occur during transmission of the RF energy to the UV bulb 24. And although placing the solid state RF sources 12 inside the lamphead 16 may increase the cooling requirements and size of the lamphead 16, the lamphead 16 will still be smaller than typical lampheads from prior art UV systems, as solid state RF sources 12 are thinner and smaller than the magnetrons used in the conventional systems.

Figure 5:
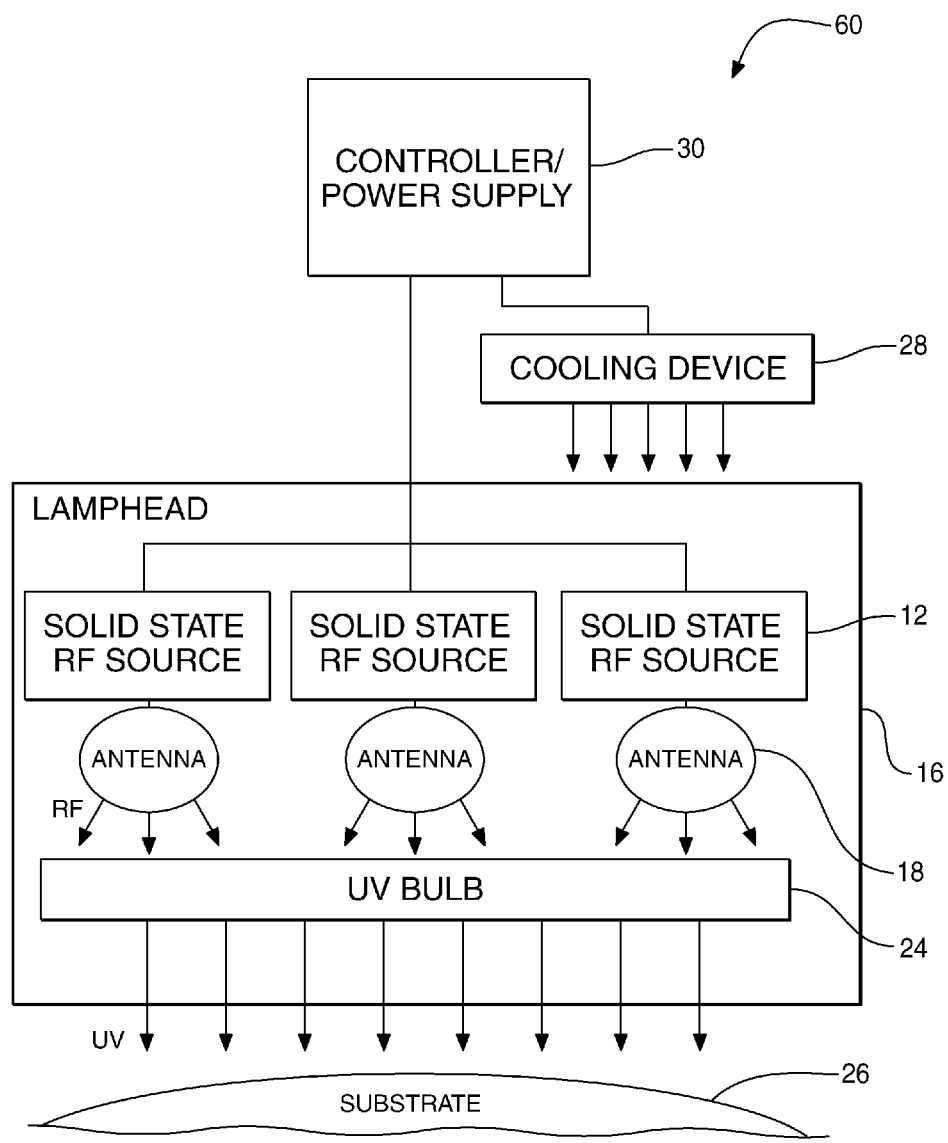
FIG. 5 is a schematic diagram of a UV irradiation system including a solid state RF source located inside a lamphead and a cooling device located outside the lamphead.

FIG. 5 provides a schematic diagram of an exemplary UV system 60 having the features of UV system 50 (FIG. 4), except the cooling device 28 is located external to the lamphead 16 for cooling the components thereof.

Figure 6:
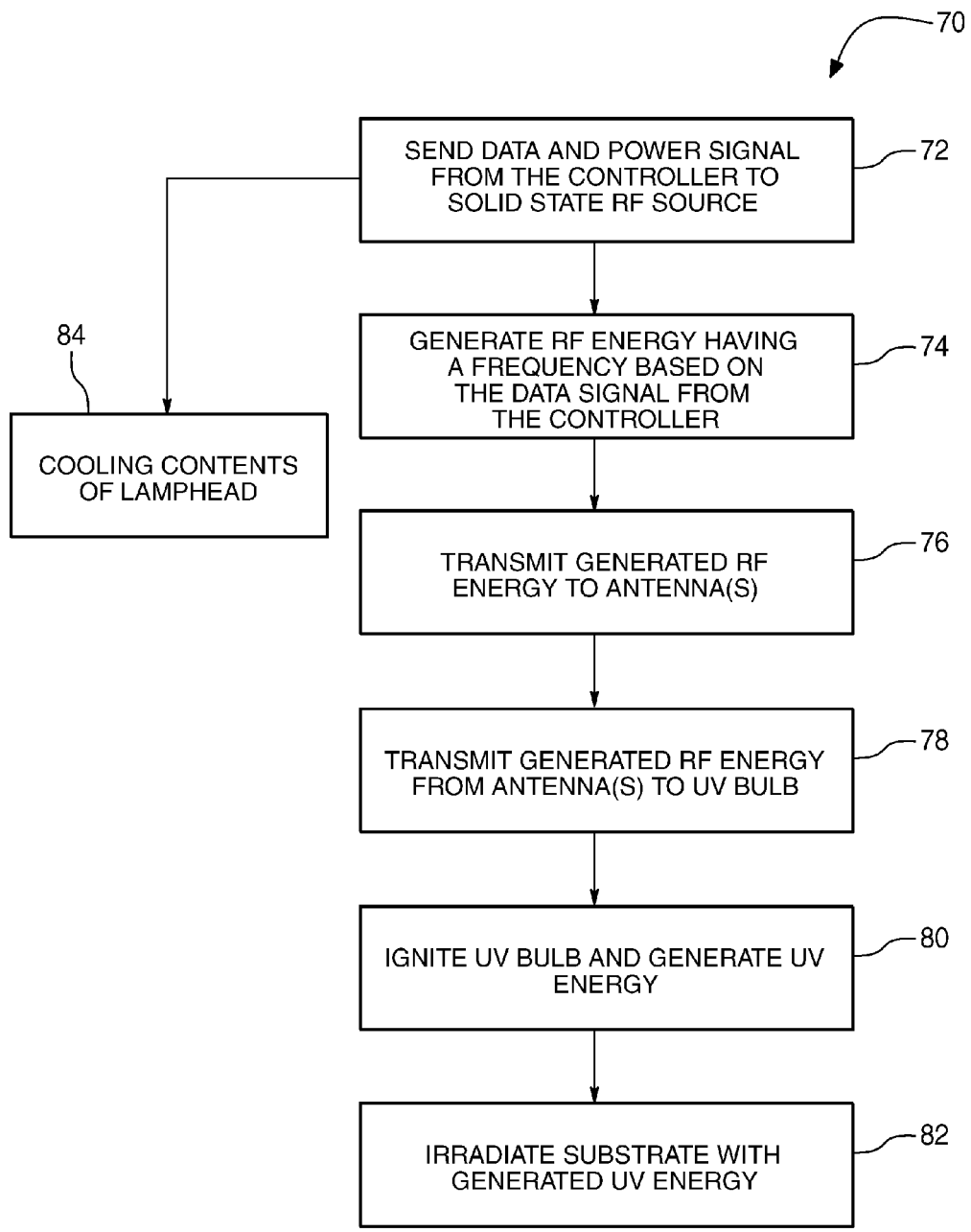
FIG. 6 is a flowchart showing a sequence of operations performed during a UV irradiation process.

FIG. 6 provides a flowchart 70 illustrating an exemplary sequence of operations that are performed during a UV irradiation process in which a substrate 26 is irradiated with UV energy. At step 72, a data signal and power signal is sent from the controller and power supply 30 and received by one or more solid state RF sources 12. The data signal defines a desired frequency for the RF energy generated by the solid state RF sources 12. Based upon the data signal and the power signal, the solid state RF sources 12 generate RF energy having the desired frequency specified in the received data signal (step 74). Alternatively, the solid state RF sources 12 generate RF energy having a pre-specified frequency. In yet another alternative, the solid state RF sources 12 generate RF energy having a default frequency in the absence of receiving the data signal defining the desired frequency.

At step 76, the generated RF energy is transmitted to a UV bulb 24 in a lamphead 16. In a particular embodiment, the generated RF energy is transmitted, such as through at least one cable 20, to at least one antenna 18 included in a lamphead 16 and coupled to the solid state RF sources 12. In a preferred embodiment, the generated RF energy is transmitted to a plurality of antennas 18. The one or more antennas 18 are arranged proximate to the UV bulb 24, and the generated RF energy is transmitted to the UV bulb 24 with the antennas 18 (step 78). In one embodiment, the solid state RF sources 12 are located externally to the lamphead 16, and transmitting the generated RF energy to the antennas 18 therefore includes transmitting the generated RF energy from outside the lamphead 16 to an interior of the lamphead 16.

At step 80, the UV bulb 24 is excited and ignited with the generated RF energy, thereby causing the UV bulb 24 to generate UV energy. At step 82, the substrate 26 is irradiated with the generated UV energy by directing the UV energy out of the lamphead 16 and at the substrate 26.

Throughout all of the above steps, the sequence of operations may also include step 84 of cooling the contents of the lamphead 16, such as the UV bulb 24. While such cooling may be achieved with internal or external air blowers, the sequence of operations may alternatively and/or in addition include directing a sheet of airflow to the UV bulb during the irradiation process, such as with an air knife internal or external to the lamphead 16. Alternatively and/or in addition, the sequence of operations may include directing a plurality of internal or external air jet streams to the lamphead 16, such as with a plurality of nozzles. The sheet of airflow and/or air jet streams may be uniform, laminar, non-uniform, and/or turbulent. Furthermore, the air jet streams and/or sheet of airflow may be formed from compressed air and/or cooled air. In one exemplary embodiment, the compressed air and/or cooled air include an innate gas.

One or more of the steps described herein, such as step 72 of the flowchart 70, can be implemented by computer program instructions supplied to the processor of any type of computer to produce a machine with a processor that executes the instructions to implement the functions/acts specified herein. These computer program instructions may also be stored in a non-transitory computer readable medium that can direct a computer to function in a particular manner. To that end, the computer program instructions may be loaded onto a computer to cause the performance of one or more operational steps and thereby produce a computer implemented process such that the executed instructions provide processes for implementing the functions/acts specified herein.

It should be noted that any device or feature of the embodiments described herein that have been described as "capable of" performing an action may also be configured to perform the action, actively perform the action, or be for performing the action. The phrase "capable of" is intended to relate to broader recitations of the device or feature.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The features disclosed herein may be combined in any manner depending on the desired aspects of the system or method. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A UV system for irradiating a substrate, the system comprising:
   a lamphead including an interior;
   a plurality of solid state RF sources, each RF source configured to generate RF energy;
   an elongated UV bulb having a length and being positioned in said interior of said lamphead and capable of emitting UV energy when excited by the RF energy generated by said plurality of solid state RF sources; and
   a plurality of RF transmitters, each one of said plurality of RF transmitters coupled to one of said plurality of solid state RF sources, said plurality of RF transmitters being positioned proximate to said elongated UV bulb and spaced apart along the length of said elongated UV bulb, and said plurality of RF transmitters configured to receive the RF energy from said plurality of solid state RF sources and direct the RF energy to different regions across the length of said elongated UV bulb.

2. The system of claim 1, wherein said plurality of solid state RF sources are located outside said interior of said lamphead.

3. The system of claim 2, wherein said plurality of RF transmitter comprise a plurality of antennas, each one of said plurality of antennas being coupled to said one of said plurality of solid state RF sources.

4. The system of claim 3, further comprising:
   a cooling device located outside said interior of said lamphead for directing cooling air at said elongated UV bulb.

5. The system of claim 3, further comprising:
   a cooling device located inside said interior of said lamphead for directing cooling air at said elongated UV bulb.

6. The system of claim 1, wherein said plurality of solid state RF sources are located inside said interior of said lamphead.

7. The system of claim 6, further comprising wherein each of said plurality of RF transmitters comprises a plurality of antennas, each one of said plurality of antennas being coupled to one of said plurality of solid state RF sources.

8. The system of claim 7, further comprising:
   a cooling device located outside said interior of said lamphead for directing cooling air at said elongated UV bulb.

9. The system of claim 7, further comprising:
   a cooling device located inside said interior of said lamphead for directing cooling air at said elongated UV bulb.

10. The system of claim 6, wherein each said RF transmitter further comprises one or a plurality of waveguides.

11. The system of claim 2, further comprising a controller for sending at least one control signal respectively to each one of said plurality of solid state RF sources, each said control signal defining a frequency for the RF energy generated by a respective one of said solid state RF source.

12. The system of claim 6, further comprising a controller for sending at least one control signal respectively to each one of said solid state RF sources, each said control signal defining a frequency for the RF energy generated by the respective one of said solid state RF source.

13. A method of irradiating a substrate with UV energy from an elongated UV bulb positioned within a lamphead, the method comprising:
   generating a first data signal defining a desired frequency;
   receiving the first data signal at a first one of a plurality of solid state RF sources;
   generating RF energy having the desired frequency with the first one of the plurality of solid state RF sources receiving the first data signal;
   receiving the generated RF energy having the desired frequency with a first one of the plurality of RF transmitters arranged along a length of the elongated UV bulb;
   directing the received RF energy from the first one of the plurality of RF transmitters to a first portion of the elongated UV bulb positioned within the lamphead;
   generating a second data signal defining the desired frequency;
   receiving the second data signal at a second one of the plurality of solid state RF sources;
   generating RF energy having the desired frequency with the second one of the plurality of solid state RF sources;
   receiving the generated RF energy having the desired frequency with a second one of the plurality of RF transmitters arranged along the length of the elongated UV bulb;
   directing the received RF energy from the second one of the plurality of RF transmitters to a second portion of the elongated UV bulb positioned within the lamphead;
   igniting the elongated UV bulb with the generated RF energy;

generating UV energy from the ignited elongated UV bulb;

directing the UV energy out of the lamphead and towards the substrate; and irradiating the substrate with the UV energy.

14. The system of claim 1, wherein said plurality of RF transmitters are positioned in said interior of said lamphead.

15. The system of claim 1, further comprising a faraday cage that includes said plurality of solid state RF sources.

16. The method of claim 13, wherein said plurality of RF transmitters are positioned in said interior of said lamphead.

* * * * *